(12) United States Patent
Naik et al.

(10) Patent No.: US 11,519,661 B2
(45) Date of Patent: *Dec. 6, 2022

(54) INCREASED VACUUM PORT AREA FOR ACHIEVING FASTER VACUUM EVACUATION TIME IN VACUUM INSULATED STRUCTURES

(71) Applicant: WHIRLPOOL CORPORATION, Benton Harbor, MI (US)

(72) Inventors: Abhay Naik, Stevensville, MI (US); Subrata Shannigrahi, Saint Joseph, MI (US); Gustavo Frattini, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/370,694

(22) Filed: Jul. 8, 2021

(65) Prior Publication Data

US 2021/0341214 A1 Nov. 4, 2021

Related U.S. Application Data

(63) Continuation of application No. 16/303,549, filed as application No. PCT/US2017/013936 on Jan. 18, 2017, now Pat. No. 11,085,690.

(51) Int. Cl.
*F25D 23/06* (2006.01)
*B01D 46/58* (2022.01)

(52) U.S. Cl.
CPC .......... *F25D 23/062* (2013.01); *B01D 46/58* (2022.01); *B01D 2279/00* (2013.01); *F25D 2201/14* (2013.01)

(58) Field of Classification Search
CPC . F25D 23/062; F25D 2201/14; B01D 46/002; B01D 2279/00
See application file for complete search history.

(56) References Cited

U.S. PATENT DOCUMENTS

| 1,022,065 A | 4/1912 | Dean |
| 2,128,336 A | 8/1938 | Torstensson |
| (Continued) | | |

FOREIGN PATENT DOCUMENTS

| EP | 0587548 A1 | 3/1994 |
| EP | 0757136 A1 | 2/1997 |
| (Continued) | | |

OTHER PUBLICATIONS

Human translation from German to English of EP0857928A1 (Year: 2021).

*Primary Examiner* — Matthew W Ing
(74) *Attorney, Agent, or Firm* — Price Heneveld LLP

(57) ABSTRACT

An outer wrapper that defines a top wall, a bottom wall, a rear wall, and first and second side walls and includes an inner liner. A trim breaker seals the outer wrapper to the inner liner to define an insulation space. A single vacuum port is disposed on each of the top wall, the bottom wall, and the first and second side walls. A plurality of vacuum ports is disposed on the rear wall. An insulative material is disposed between the outer wrapper and the inner liner. A filter media is disposed proximate each vacuum port such that air can be drawn from the insulation space past the filter media and through each vacuum port.

21 Claims, 15 Drawing Sheets

(56) References Cited

U.S. PATENT DOCUMENTS

| | | |
|---|---|---|
| 3,010,262 A | 11/1961 | Rumsey, Jr. |
| 3,052,019 A * | 9/1962 | Strasser ................ E04B 1/803 |
| | | 156/286 |
| 3,358,059 A | 12/1967 | Snyder |
| 3,739,936 A | 6/1973 | Jones, Jr. |
| 4,132,755 A | 1/1979 | Johnson |
| 5,252,408 A | 10/1993 | Bridges et al. |
| 5,500,305 A | 3/1996 | Bridges et al. |
| 5,509,248 A | 4/1996 | Dellby et al. |
| 5,512,345 A | 4/1996 | Tsutsumi et al. |
| 5,586,680 A | 12/1996 | Dellby et al. |
| 5,827,385 A | 10/1998 | Meyer et al. |
| 6,090,335 A | 7/2000 | McClure et al. |
| 6,109,712 A * | 8/2000 | Haworth ............. A47L 15/4209 |
| | | 312/406 |
| 6,656,411 B1 | 12/2003 | McClure et al. |
| 8,298,473 B2 | 10/2012 | Dull et al. |
| 8,678,530 B2 | 3/2014 | Wilson et al. |
| 8,944,541 B2 | 2/2015 | Allard et al. |
| 9,132,592 B2 | 9/2015 | Tobbe et al. |
| 10,220,605 B2 | 3/2019 | Stephenson et al. |
| 10,605,520 B1 | 3/2020 | Ekshinge et al. |
| 10,746,343 B2 * | 8/2020 | Allard ................... F25D 23/085 |
| 11,029,080 B2 | 6/2021 | Naik et al. |
| 11,035,607 B2 | 6/2021 | Naik et al. |
| 11,085,690 B2 * | 8/2021 | Naik ..................... F25D 23/062 |
| 2005/0235682 A1 * | 10/2005 | Hirai ..................... F25D 23/062 |
| | | 312/401 |
| 2009/0038244 A1 | 2/2009 | Kuhn et al. |
| 2010/0136231 A1 * | 6/2010 | Guttinger ............. F25D 23/062 |
| | | 427/236 |
| 2012/0104923 A1 * | 5/2012 | Jung ..................... F25D 23/066 |
| | | 312/406 |
| 2013/0257257 A1 | 10/2013 | Cur et al. |
| 2014/0346942 A1 | 11/2014 | Kim et al. |
| 2017/0159999 A1 | 6/2017 | Deka et al. |
| 2017/0160001 A1 | 6/2017 | Deka et al. |
| 2017/0276287 A1 | 9/2017 | Kawarazaki et al. |
| 2019/0128592 A1 | 5/2019 | Westlake et al. |
| 2019/0145697 A1 * | 5/2019 | Naik ..................... F16L 59/065 |
| | | 312/400 |
| 2019/0285336 A1 * | 9/2019 | Naik ..................... F25D 23/063 |
| 2019/0293339 A1 | 9/2019 | Gomes et al. |
| 2020/0103067 A1 | 4/2020 | Allard et al. |

FOREIGN PATENT DOCUMENTS

| | | |
|---|---|---|
| EP | 0857928 A1 | 8/1998 |
| EP | 1335171 A1 | 8/2003 |
| GB | 730146 | 5/1955 |
| JP | H04366093 A | 12/1992 |
| JP | H04366094 A | 12/1992 |
| WO | 9829309 A1 | 7/1998 |
| WO | 03081152 A1 | 10/2003 |
| WO | 2005093349 A1 | 10/2005 |

* cited by examiner

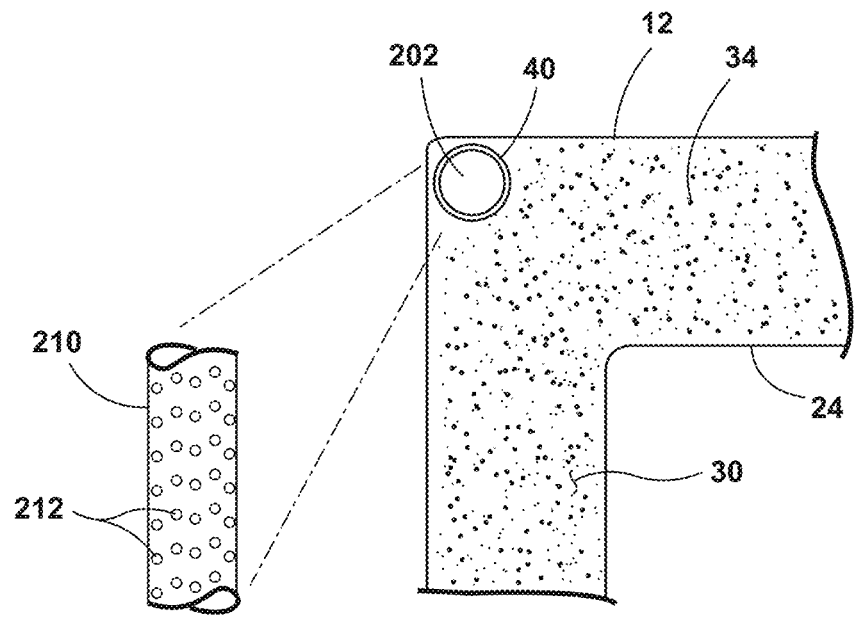
FIG. 11A  FIG. 11
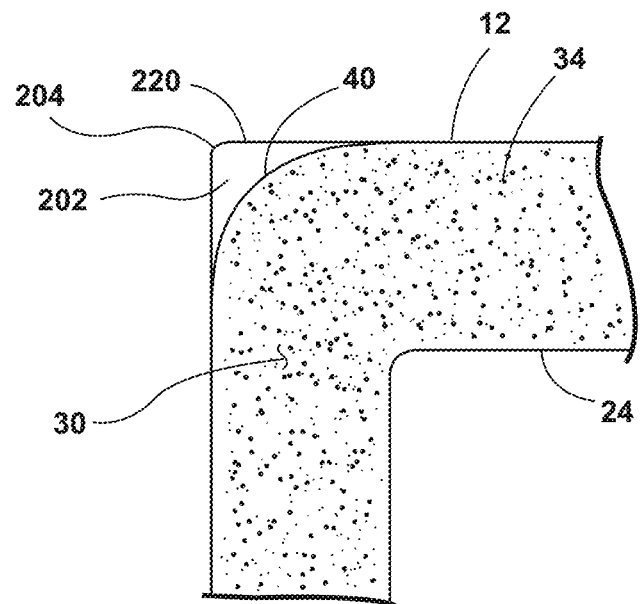
FIG. 12

INCREASED VACUUM PORT AREA FOR ACHIEVING FASTER VACUUM EVACUATION TIME IN VACUUM INSULATED STRUCTURES

CROSS-REFERENCE TO RELATED APPLICATIONS

This Application is a continuation of U.S. application Ser. No. 16/303,549 filed 20 Nov. 2018, now U.S. Pat. No. 11,085,690, granted 10 Aug. 2021, and titled "INCREASED VACUUM PORT AREA FOR ACHIEVING FASTER VACUUM EVACUATION TIME IN VACUUM INSULATED STRUCTURES," which claimed priority to International Application No. PCT/US2017/013936 filed 18 Jan. 2017, the entireties of which are incorporated herein by reference.

This application is related to U.S. application Ser. No. 16/302,939, filed 19 Nov. 2018, now U.S. Pat. No. 11,035,607, granted 15 Jun. 2021, which claims priority to International Application No. PCT/US2017/013949, filed on 18 Jan. 2017, entitled "USE OF MULTIPLE PORT LOCATIONS FOR ACHIEVING FASTER VACUUM EVACUATION TIME IN VACUUM INSULATED STRUCTURES," and U.S. application Ser. No. 16/302,923, filed 19 Nov. 2018, now U.S. Pat. No. 11,029,080, granted 8 Jun. 2021, which claims priority to International Application No. PCT/US2017/013940, filed on 18 Jan. 2017, entitled "USE OF RIGID OR PERMEABLE CONDUITS FOR ACHIEVING FASTER VACUUM EVACUATION TIME IN VACUUM INSULATED STRUCTURES."

FIELD OF THE DISCLOSURE

The present device generally relates to a vacuum insulated structure, and more specifically, to an increased vacuum port area for achieving faster vacuum evacuation time in vacuum insulated structures.

BACKGROUND OF THE DISCLOSURE

Increasing the insulative qualities of appliances, and particularly refrigerating appliances, is helpful to provide efficient, quality products for consumer use. In addition, manufacturing appliances with speed and efficiency lowers energy consumption and speed to market. Processes to achieve these qualities are useful.

SUMMARY

In one aspect, an appliance includes an outer wrapper that defines a top wall, a bottom wall, a rear wall, and first and second side walls and includes an inner liner. A trim breaker seals the outer wrapper to the inner liner to define an insulation space. A single vacuum port is disposed on each of the top wall, the bottom wall, and the first and second side walls. A plurality of vacuum ports is disposed on the rear wall. An insulative material is disposed between the outer wrapper and the inner liner. A filter media is disposed proximate each vacuum port such that air can be drawn from the insulation space past the filter media and through each vacuum port.

In another aspect, an appliance includes an outer wrapper that defines a top wall, a bottom wall, a rear wall, and first and second side walls. An inner liner is sealed to the outer wrapper to define an insulation space. A vacuum port is disposed on each of the top wall, the bottom wall, the rear wall, and the first and second side walls. An insulative material is disposed between the outer wrapper and the inner liner. A filter media is disposed proximate each vacuum port such that air can be drawn from the insulation space past the filter media and through each vacuum port to maintain a negative pressure in the insulation space.

In yet another aspect, a method of making an appliance includes forming an outer wrapper defining a top wall, a bottom wall, a rear wall, and first and second side walls. An inner liner is formed. The outer wrapper is sealed to the inner liner to define an insulation space. A vacuum port is formed in each of the top wall, the bottom wall, the rear wall, and the first and second side walls. An insulative material is inserted between the outer wrapper and the inner liner. A filter media is positioned proximate each vacuum port such that air can be drawn from the insulation space past the filter media and through each vacuum port.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 11 is a top partial elevational cross-sectional view of a portion of the insulation space of an appliance of the present disclosure;

FIG. 11A is a partial elevational view of a filter tube for use with an appliance of the present disclosure;

FIG. 12 is a partial elevational cross-sectional view of a portion of an appliance of the present disclosure;

DETAILED DESCRIPTION OF THE EMBODIMENTS

Figure 1:
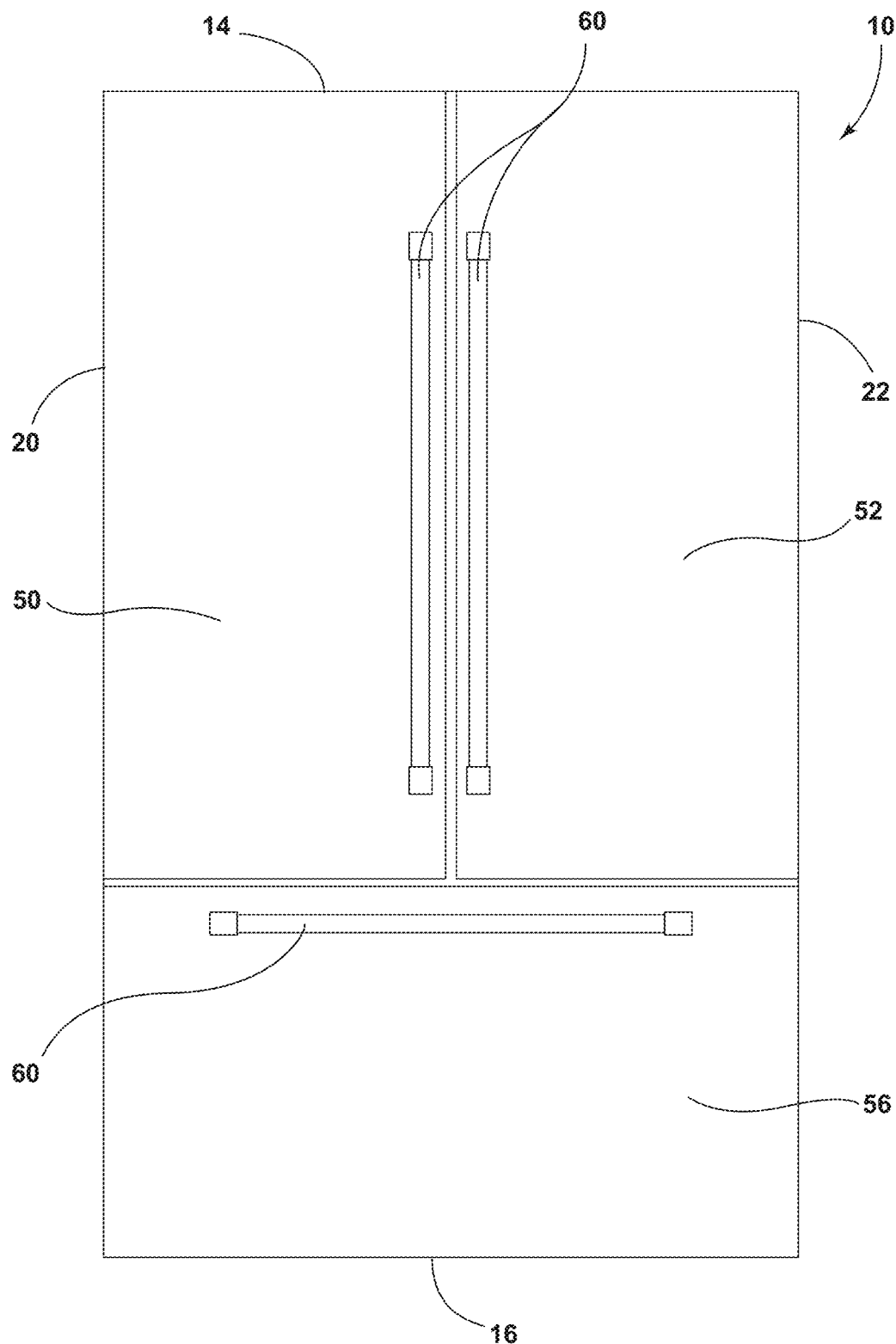
FIG. 1 is a front elevational view of one embodiment of an appliance of the present disclosure.

It is to be understood that the specific devices and processes illustrated in the attached drawings, and described in the following specification are simply exemplary embodiments of the inventive concepts defined in the appended claims. Hence, other physical characteristics relating to the embodiments disclosed herein are not to be considered as limiting, unless the claims expressly state otherwise.

The present illustrated embodiments reside primarily in combinations of method steps and apparatus components related to a vacuum insulated structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring now to FIGS. 1-15, reference numeral 10 generally designates an appliance having an outer wrapper 12 that defines a top wall 14, a bottom wall 16, a rear wall 18, and first and second side walls 20, 22 and includes an inner liner 24. A trim breaker 26 seals the outer wrapper 12 to the inner liner 24 to define an insulation space 30. A single vacuum port 32 is disposed on each of the top wall 14, the bottom wall 16, and the first and second side walls 20, 22. A plurality of vacuum ports 32 is disposed on the rear wall 18. An insulative material 34 is disposed between the outer wrapper 12 and the inner liner 24. A filter media 40 is disposed proximate each vacuum port 32 such that air can be drawn from the insulation space 30 past the filter media 40 and through each vacuum port 32.

Figure 1A:
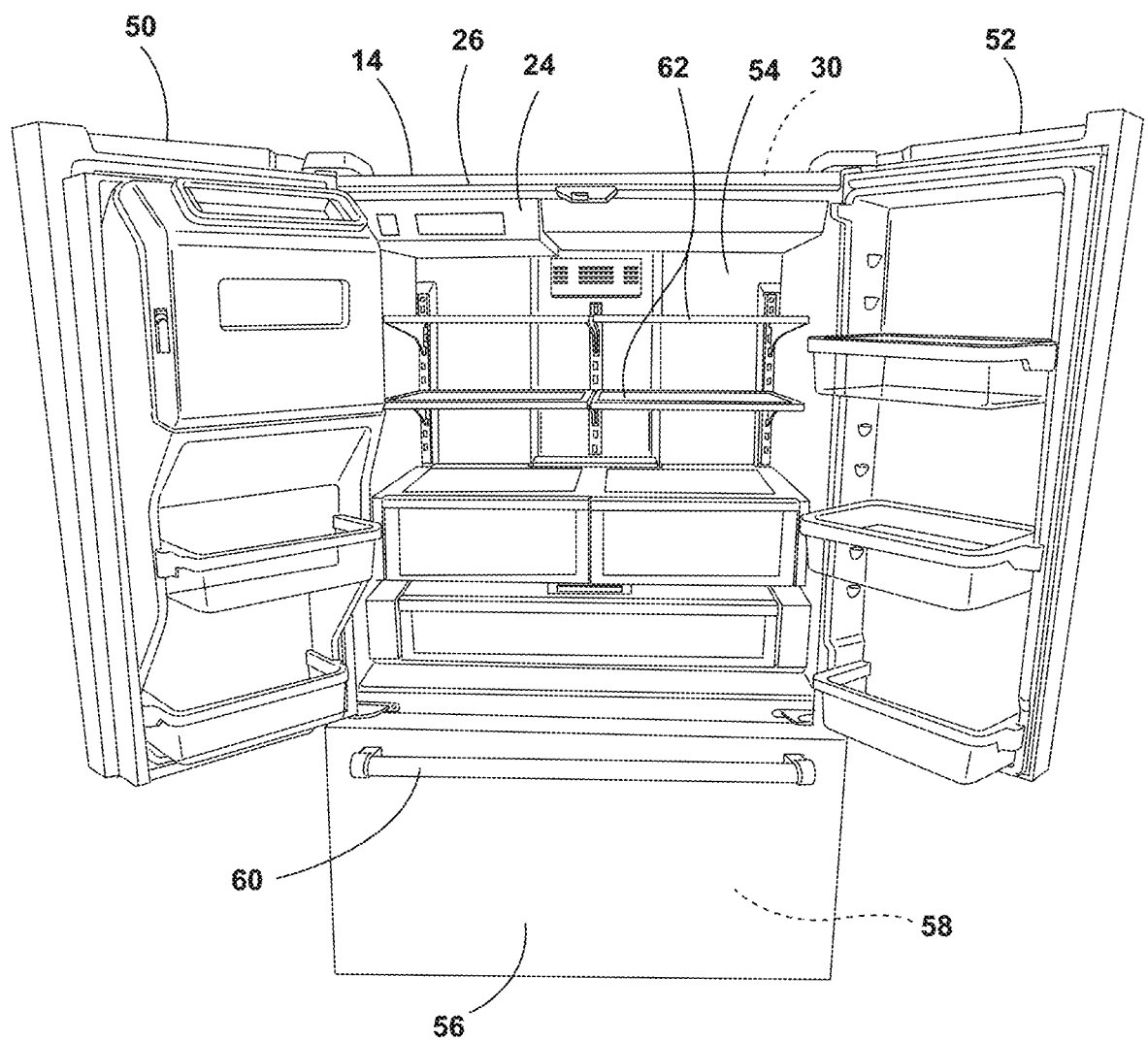
FIG. 1A is a front elevational view of the appliance of FIG. 1 with first and second doors of the appliance in an open position.

With reference again to FIG. 1, the illustrated appliance 10 is a refrigerator assembly that includes French doors 50, 52 that are pivotally coupled with a refrigerator compartment 54 and operable between open and closed positions. The refrigerator assembly also includes a lower pull out drawer 56 that defines a freezer compartment 58. It will generally be understood that the features, as set forth herein, could be applied to any appliance having any general configuration. Further, the door configuration of the appliance 10 can vary from that shown in FIG. 1. The doors 50, 52, as illustrated in FIG. 1, include handles 60 configured to allow a user to move the doors 50, 52 between open and closed positions. The refrigerator compartment 54 and the freezer compartment 58 include shelving 62, as shown in FIG. 1A, that can be adjusted and moved, depending on consumer preference. The outer wrapper 12 of the appliance 10 is generally formed from a metal material, which may be steel, aluminum, etc. The inner liner 24 is also constructed from a metal material, which may be steel, aluminum, etc. However, sealed plastics, or other materials that can maintain an airtight seal, could also be used in conjunction with the systems, as set forth herein.

Figure 2:
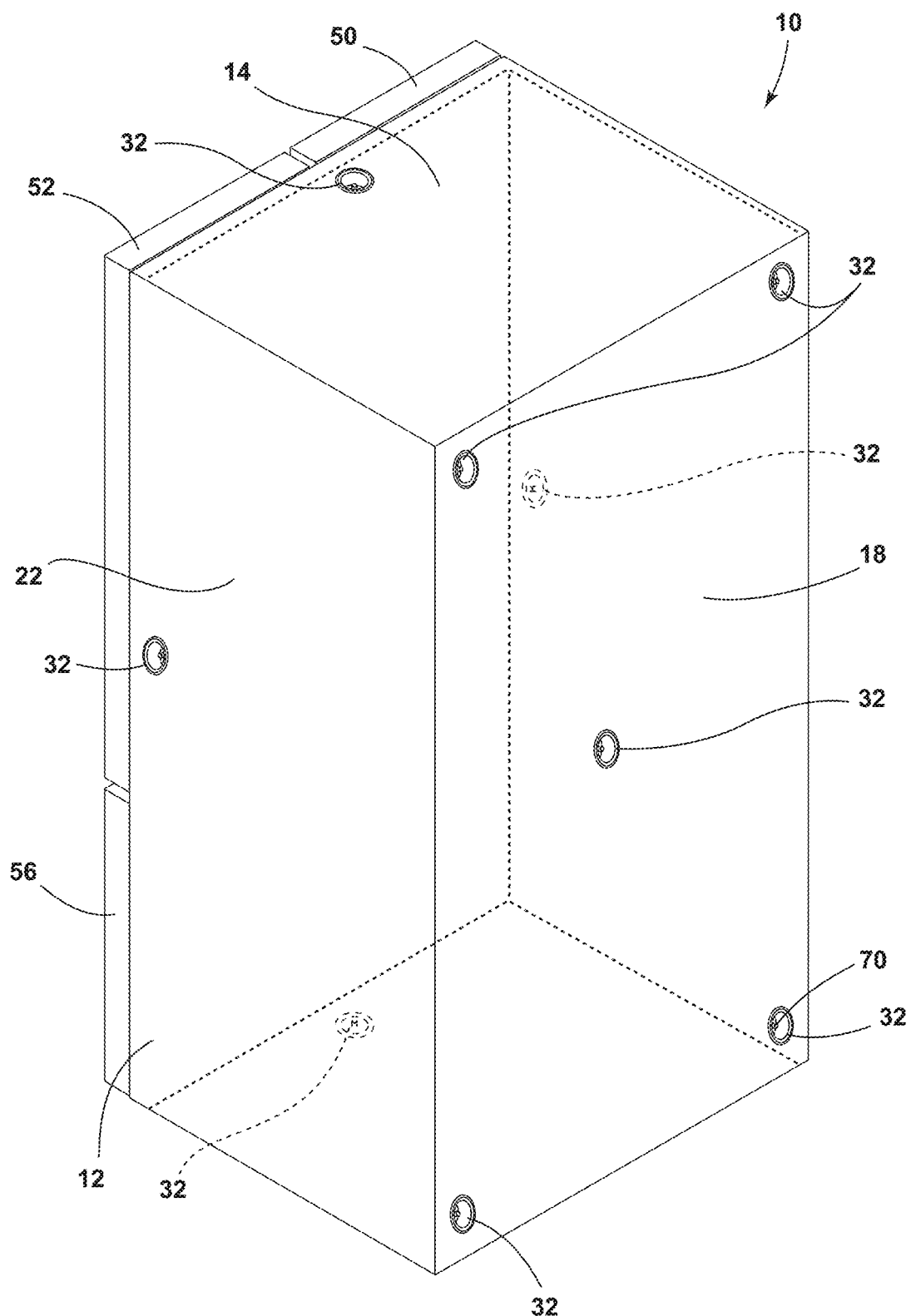
FIG. 2 is a top perspective view of a rear portion of an appliance of the present disclosure.

With reference now to FIG. 2, the illustrated embodiment includes a plurality of vacuum ports 32 that are spaced at predetermined positions to draw a sufficient amount of vacuum from areas of the insulation space 30. As a result of the additional vacuum ports 32, the total vacuum time to place the insulative material 34 in a vacuum state and draw fluid (in the form of air) from the insulation space 30 is lessened. Consequently, refrigerator assemblies can be constructed at a faster rate and with a greater degree of negative pressure between the inner liner 24 and the outer wrapper 12. Each of the ports 32 include a valve system 70 configured to prevent air from entering the insulation space 30 after the vacuum process has been completed. In the illustrated embodiment of FIGS. 2 and 2A, a vacuum port 32 is disposed on each of the top wall 14, the bottom wall 16, the rear wall 18, and the first and second side walls 20, 22. However, it will be noted that more vacuum ports 32 could be disposed on any of the top wall 14, the bottom wall 16, the rear wall 18, and the first and second side walls 20, 22 to increase the speed in which a negative pressure is obtained within the insulation space 30.

In some instances, the vacuum ports 32 may be removed from certain walls of the appliance 10. For example, in the event the appliance 10 will have exposed first and second side walls 20, 22 that are readily viewable by the consumer, the vacuum ports 32 may be omitted from the first and second side walls 20, 22. In this instance, additional vacuum ports 32 may be disposed on first and second sides of the top wall 14 proximate the first and second side walls 20, 22 or on first and second sides of the bottom wall 16 in close proximity to the first and second side walls 20, 22. In addition, more vacuum ports 32 on the rear wall 18 may also be positioned on the outer wrapper 12 to compensate for the loss of a vacuum port 32 of each of the first and second side walls 20, 22. The valves that make up the vacuum ports 32 are configured to attach with a vacuum hose 80 (FIG. 13) and may include ball valves, butterfly valves, check valves, choke valves, diaphragm valves, gate valves, globe valves, poppet valves, etc. A simple crimping solution or an end cap can also be used to close the vacuum hose 80. It will be understood that any kind and any number of valves may be used and that this disclosure is not limited by any of the valve systems noted above.

Figure 2A:
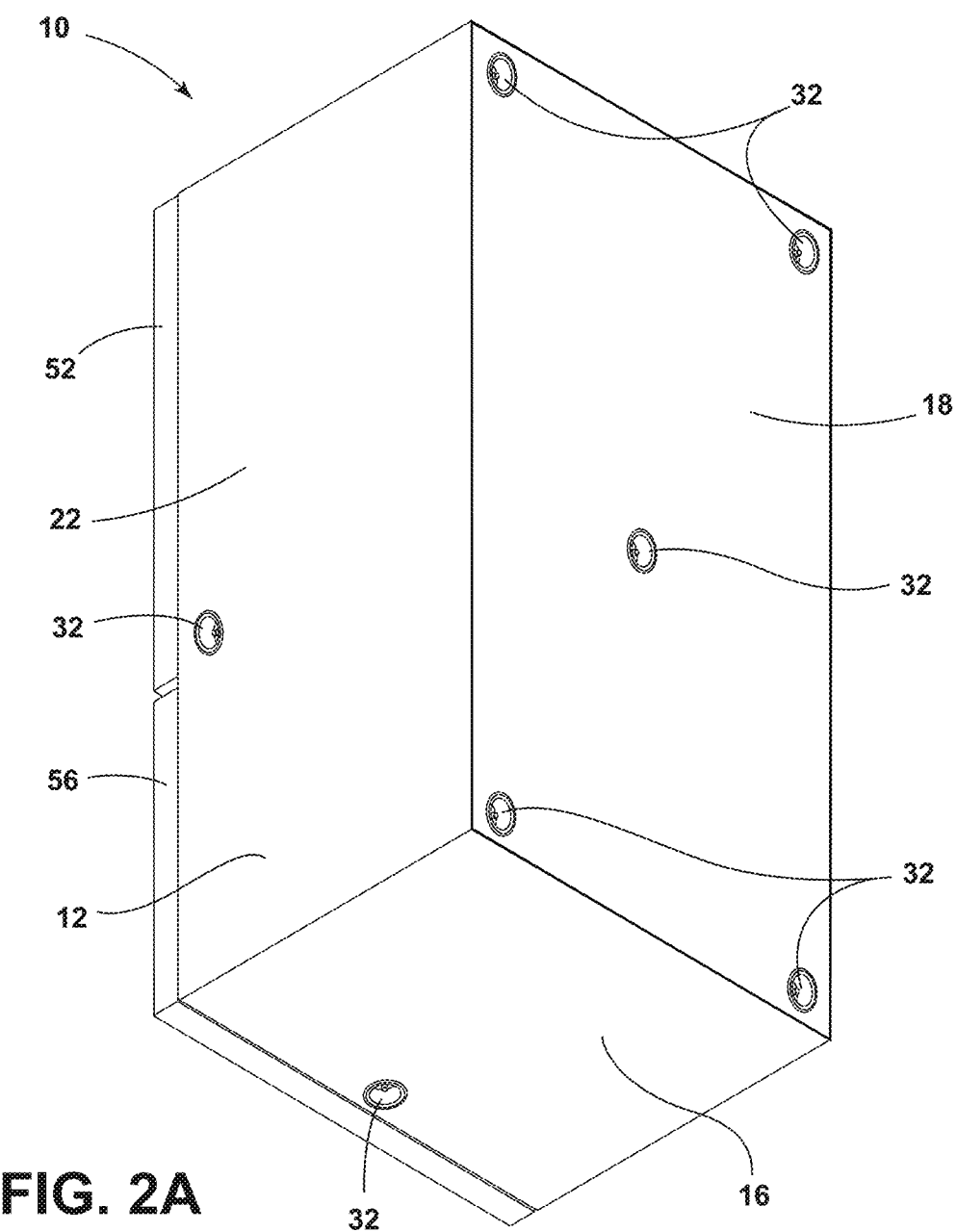
FIG. 2A is a bottom perspective view of the appliance of FIG. 2.
Figure 2B:
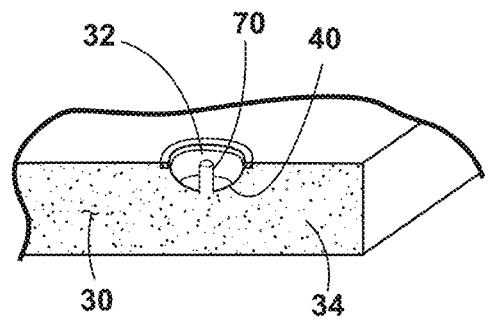
FIG. 2B is a partial perspective cross-sectional view of a vacuum port on an appliance of the present disclosure.

It will be understood that the inner liner 24 and the outer wrapper 12 are connected at the trim breaker 26 generally disposed proximate the opening of the appliance 10. The trim breaker 26 is sealed and airtight such that air can neither escape nor enter into the insulation space 30 between the outer wrapper 12 and the inner liner 24 at the trim breaker 26. In addition, it will be understood that the insulative material 34 is disposed throughout the appliance 10 in the insulation space 30. During assembly of the appliance 10, the insulative material 34 is poured, or otherwise blown into, the insulation space 30 before the insulation space 30 is sealed airtight. In addition, it will be noted that, as illustrated in FIGS. 2 and 2A, the filter media 40 is disposed between the vacuum port 32 and the insulative material 34. The filter media 40 acts to prevent insulative material 34 from being drawn through the vacuum port 32 when a negative pressure is placed on the insulation space 30. Accordingly, the insulative material 34 is maintained in the insulation space 30 between the outer wrapper 12 and the inner liner 24 as air is drawn from the insulation space 30 by an external vacuum pump. The filter media 40 may have a variety of constructions and may be constructed from sintered metal, plastic, etc. The filter media 40, or portions of the filter media 40, may also be constructed from a fiberglass based filter media. Regardless of the filter media material choice, the pores of the filter media 40, and specifically, the size of the pores, will be dictated by the size of the granules, fibers, or strands that make up the insulative material 34 disposed in the insulation space 30. The pores of the filter media 40 will be smaller than the fibers, strands, or granules of the insulative material 34. Accordingly, air can be drawn from the insulation space 30 without removing the insulative material 34 after the insulative material 34 is installed between the inner liner 24 and the outer wrapper 12.

Figure 3:
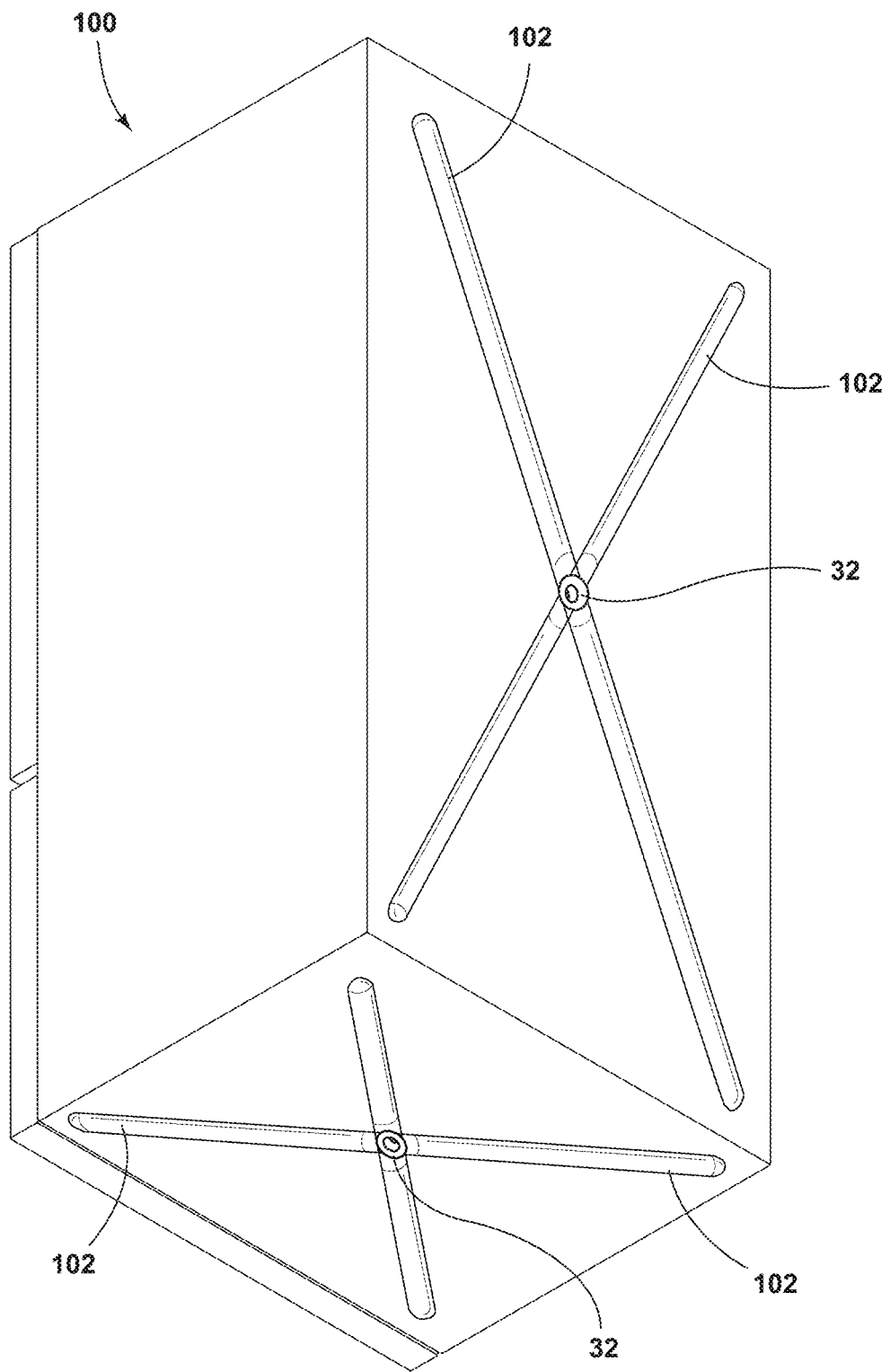
FIG. 3 is a bottom perspective view of another appliance of the present disclosure.
Figure 3A:
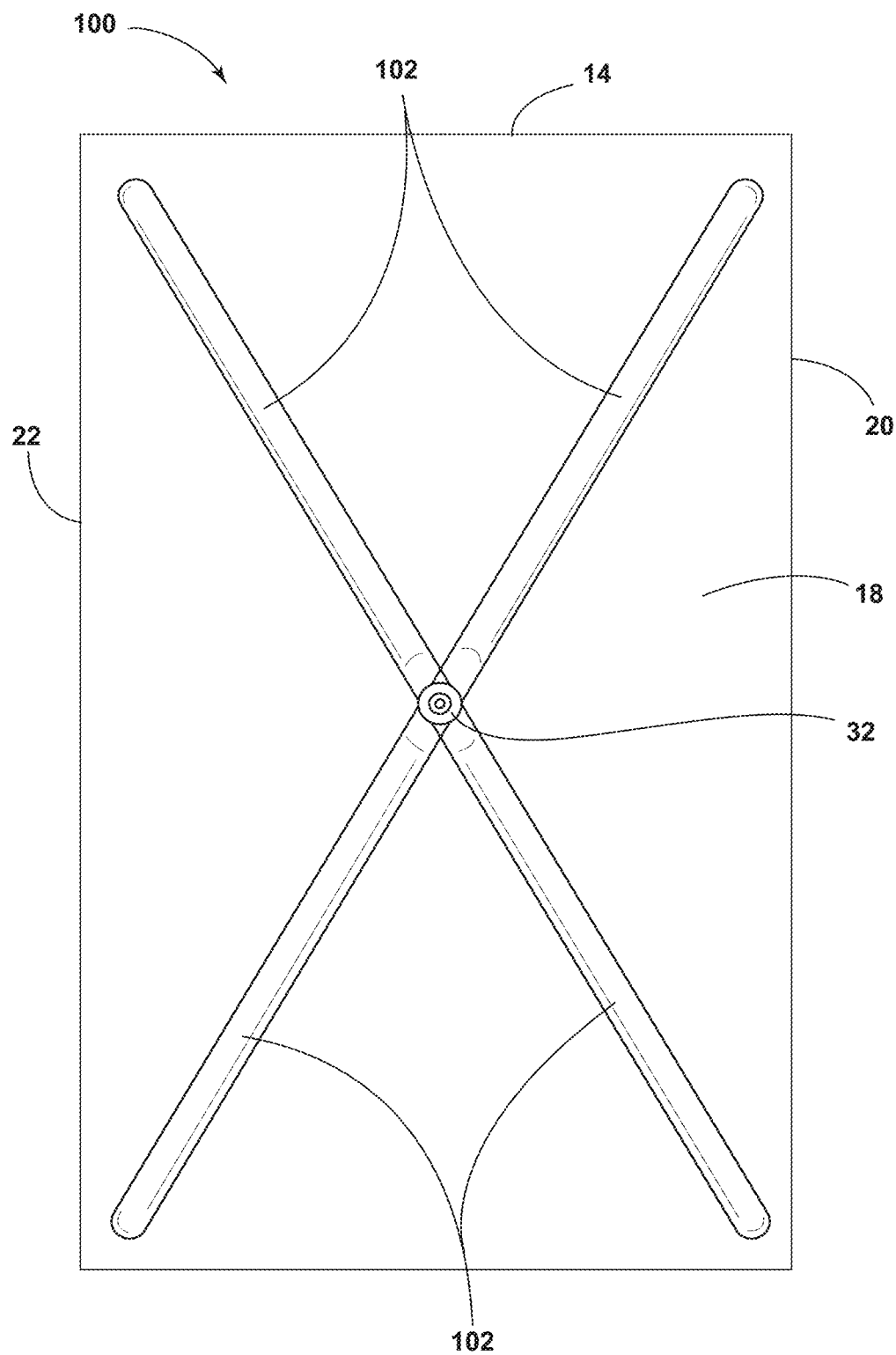
FIG. 3A is a rear elevational view of the appliance of FIG. 3.
Figure 3B:
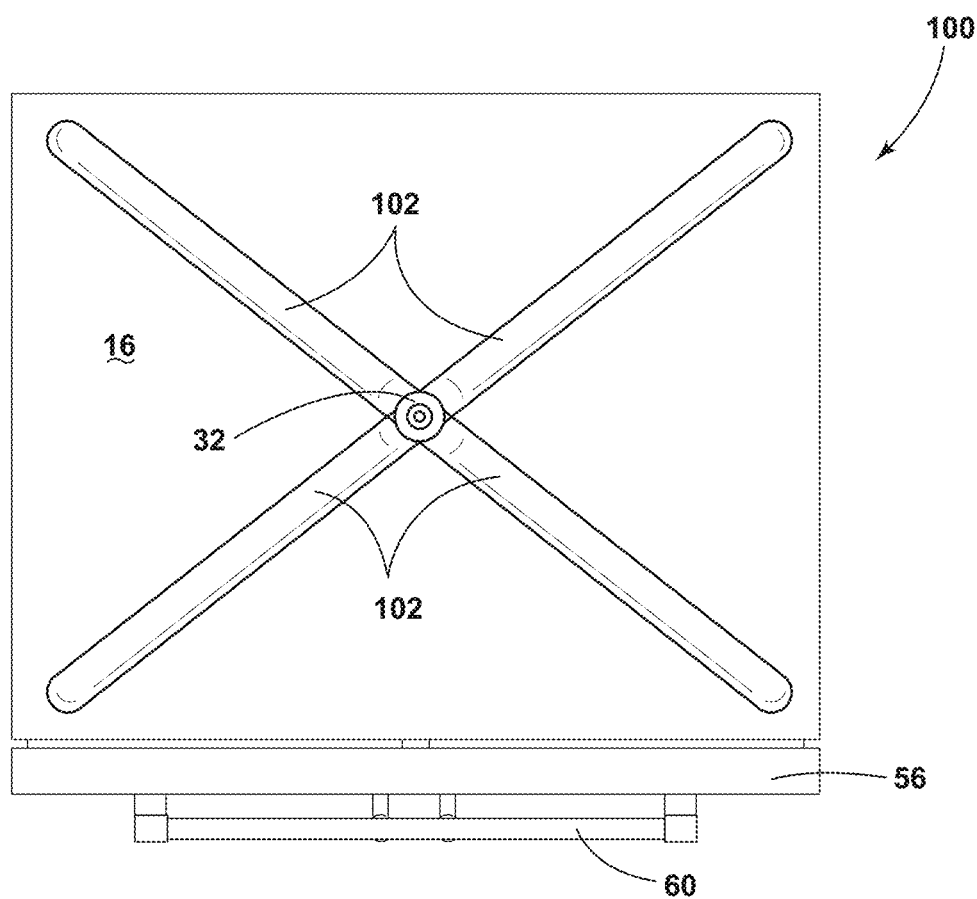
FIG. 3B is a bottom plan view of the appliance of FIG. 3.
Figure 3C:
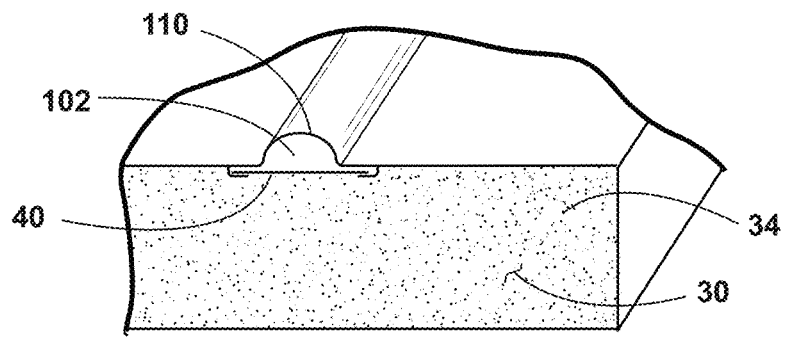
FIG. 3C is a partial perspective cross-sectional view of a channel on an appliance of the present disclosure.

With reference now to FIGS. 3-3C, the illustrated appliance 100 includes a plurality of channels 102 that are in fluid communication with each vacuum port 32. The channels 102 are disposed on each of the rear wall 18 and the bottom wall 16. The channels 102 are configured to extend to distal corners 104 of the rear wall 18 and distal corners 106 of the bottom wall 16. Accordingly, when the insulation space 30 is being vacuumed at the vacuum port 32, air is drawn through the channels 102 from the insulation space 30 and out the vacuum port 32. In this instance, the filter media 40 is elongate and disposed along each of the channels 102 to prevent the insulative material 34 from entering into the channel 102 and being withdrawn from the vacuum port 32. By increasing the overall vacuum space on the back wall and the bottom wall 16 of the appliance 10, the time to place the insulation space 30 under a suitable negative pressure is lessened.

As shown in FIG. 3C, the filter media 40 may include a relatively elongate, planar filter screen formed from a sintered metal, porous plastic, or fiberglass material that extends along the entire length of each channel 102. In this instance, the channel 102 is defined from a protruding outer casing 110 that protrudes from a planar extent of the rear wall 18 and the bottom wall 16. The casing 110 may be integrally formed with a wall of the appliance 10, or may be sealingly coupled with a wall of the appliance 10 via welding, adhesives, mechanical gaskets, etc. The casing 110 may include an arcuate cross-section, as shown, or have a square, triangular, etc. cross-section. The channel 102 draws air through the filter media 40 of the planar filter screen, while maintaining the insulative material 34 within the insulation space 30. It will be understood that the filter media 40 may be any of a number of variety of shapes and does not necessarily need to be flat.

Figure 4A:
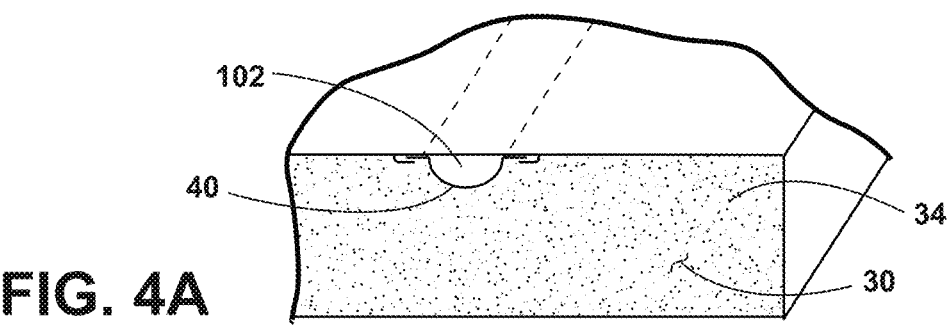
FIG. 4A is a partial perspective cross-sectional view of an insulation space of an appliance of the present disclosure with a channel extending therethrough.
Figure 4:
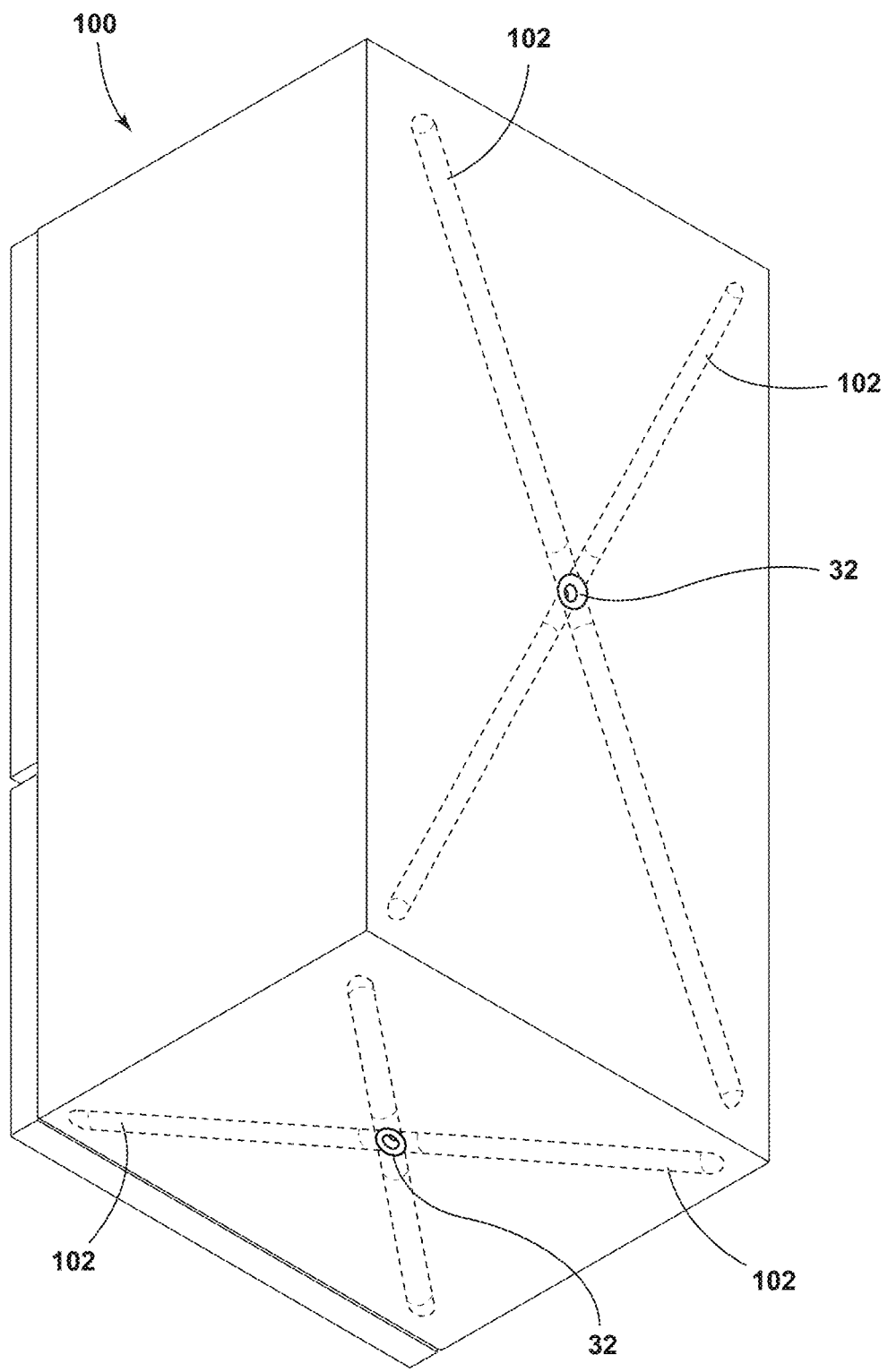
FIG. 4 is a bottom perspective view of an appliance of the present disclosure that includes vacuum channels.
Figure 5:
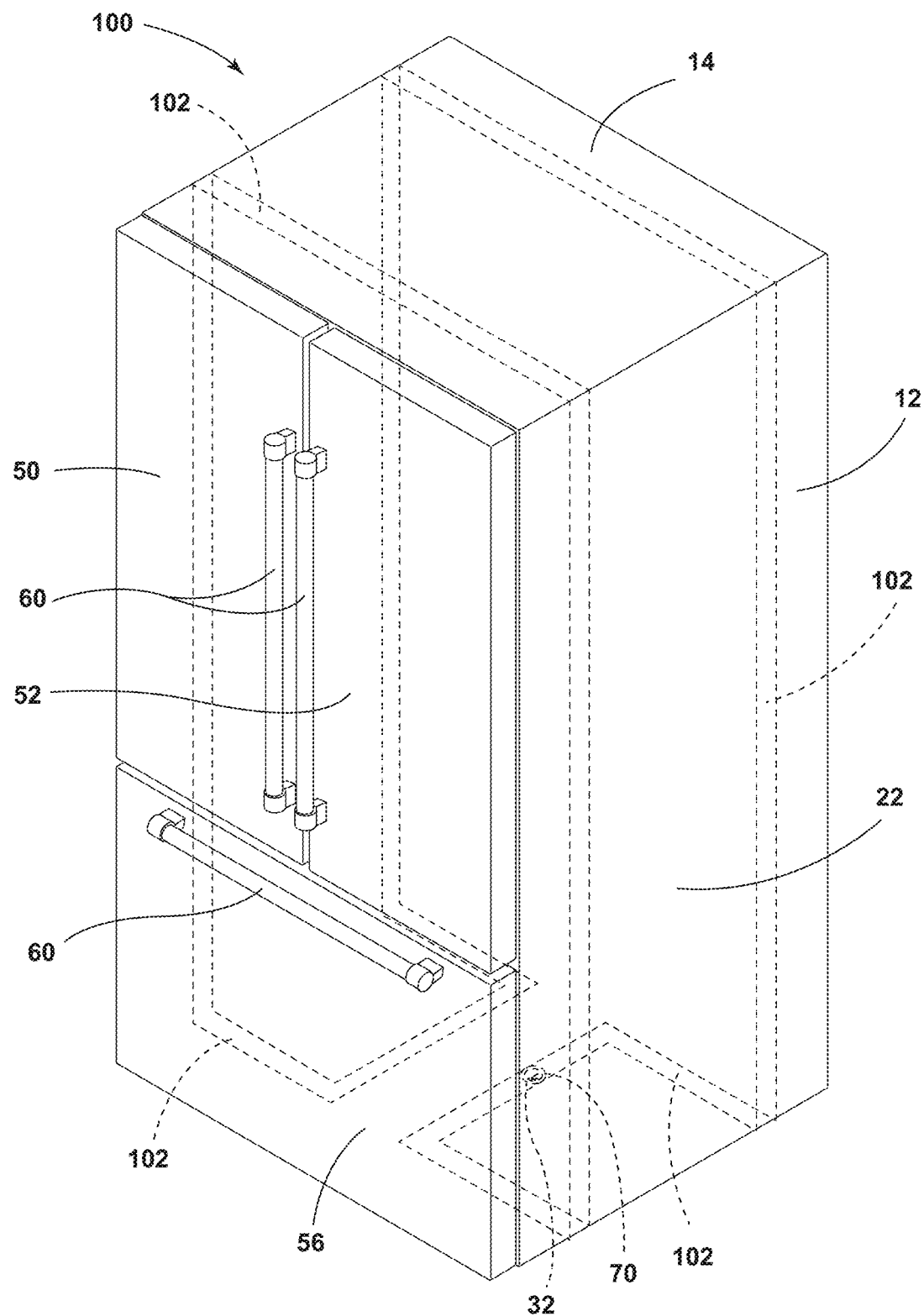
FIG. 5 is a front top perspective view of another appliance of the present disclosure.
Figure 6:
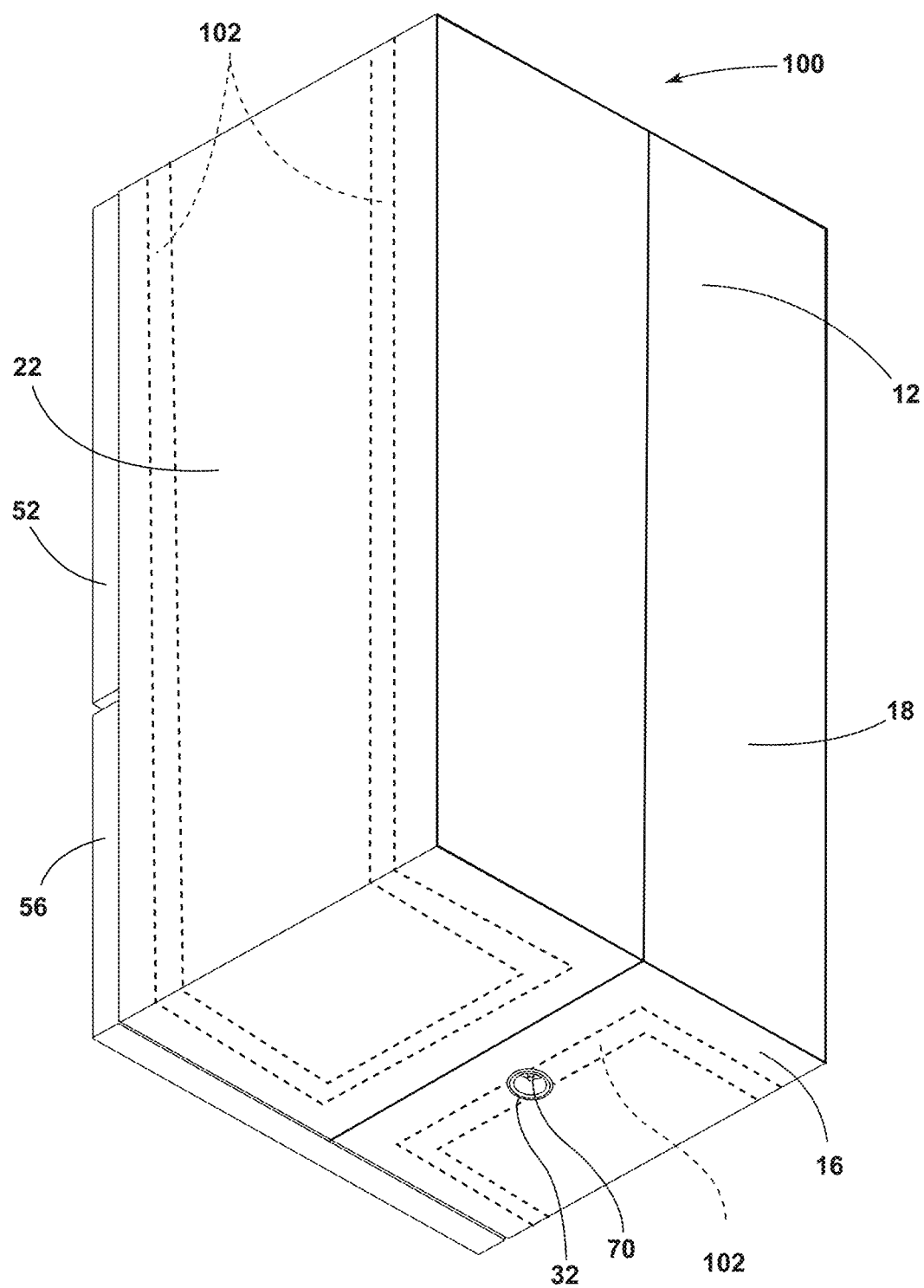
FIG. 6 is a bottom perspective view of the appliance of FIG. 5.
Figure 7:
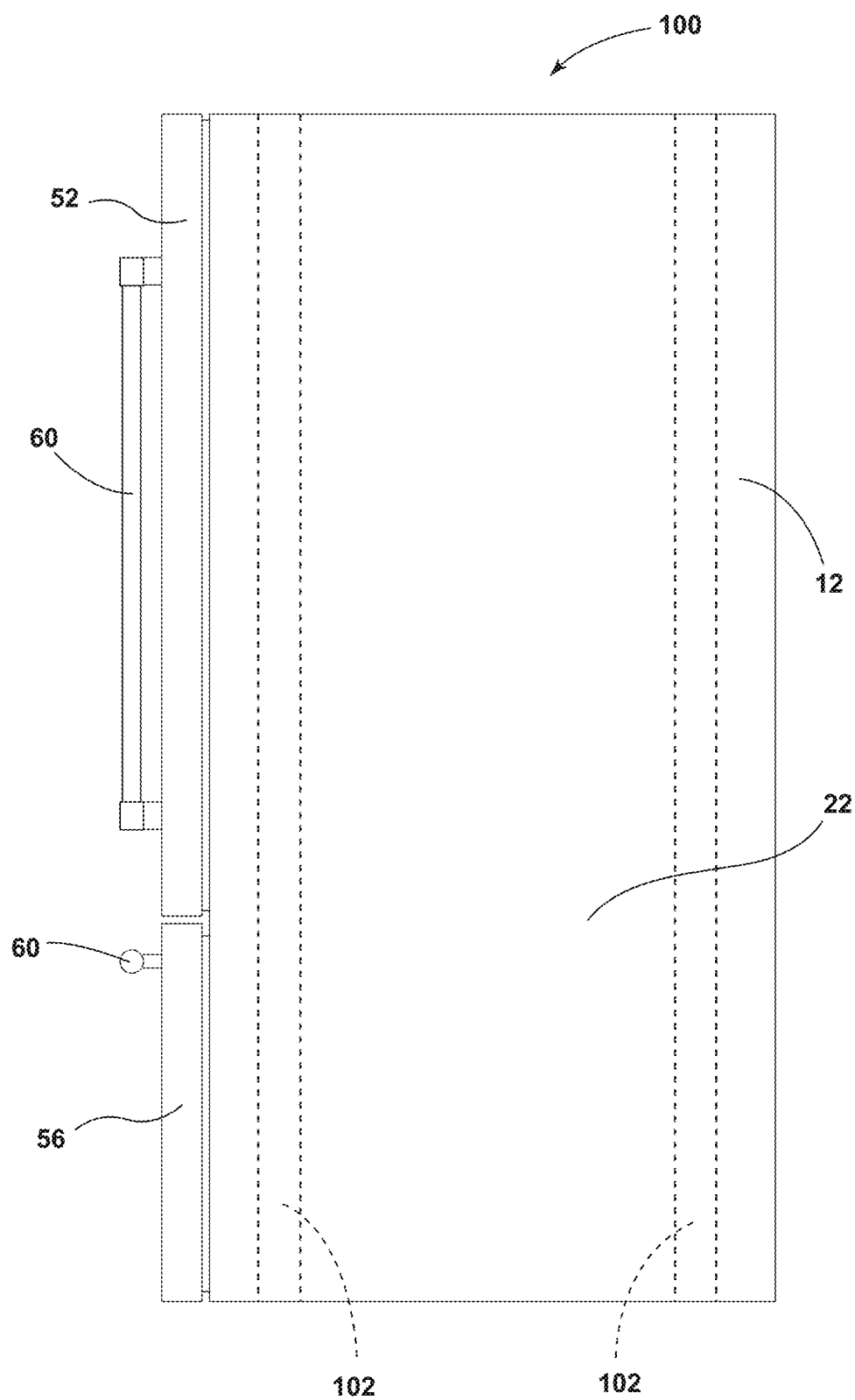
FIG. 7 is a side elevational view of the appliance of FIG. 5.
Figure 8:
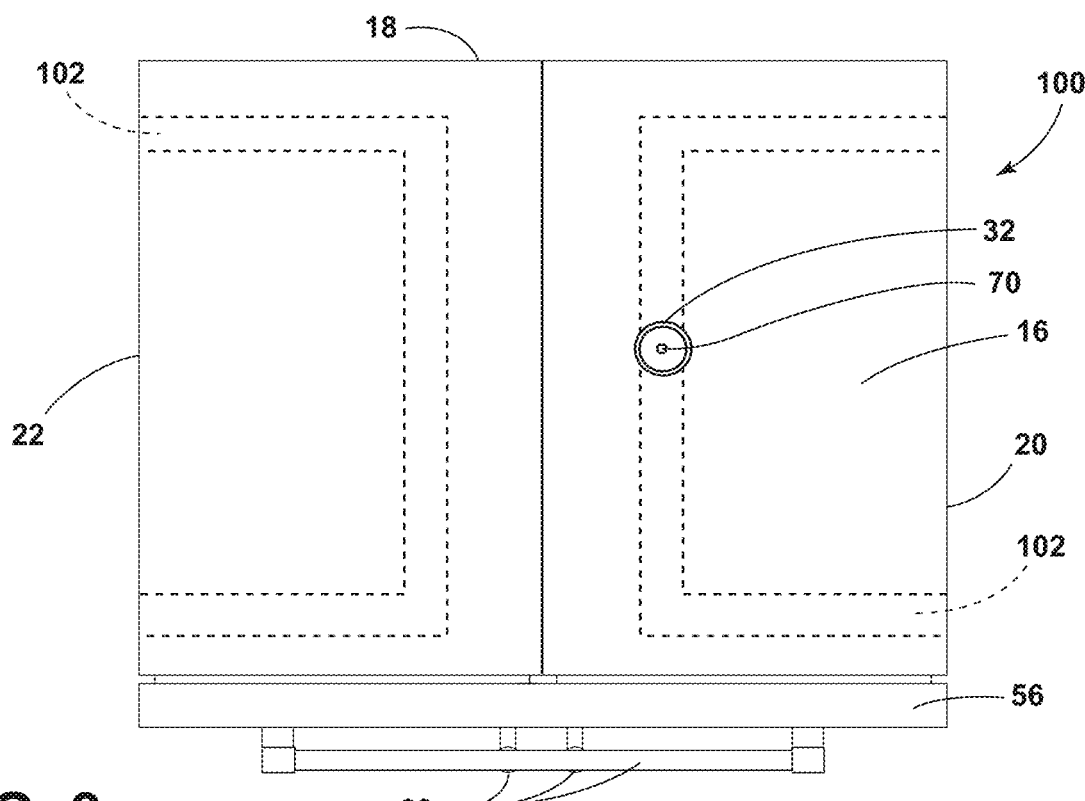
FIG. 8 is a bottom plan view of the appliance of FIG. 5.
Figure 9:
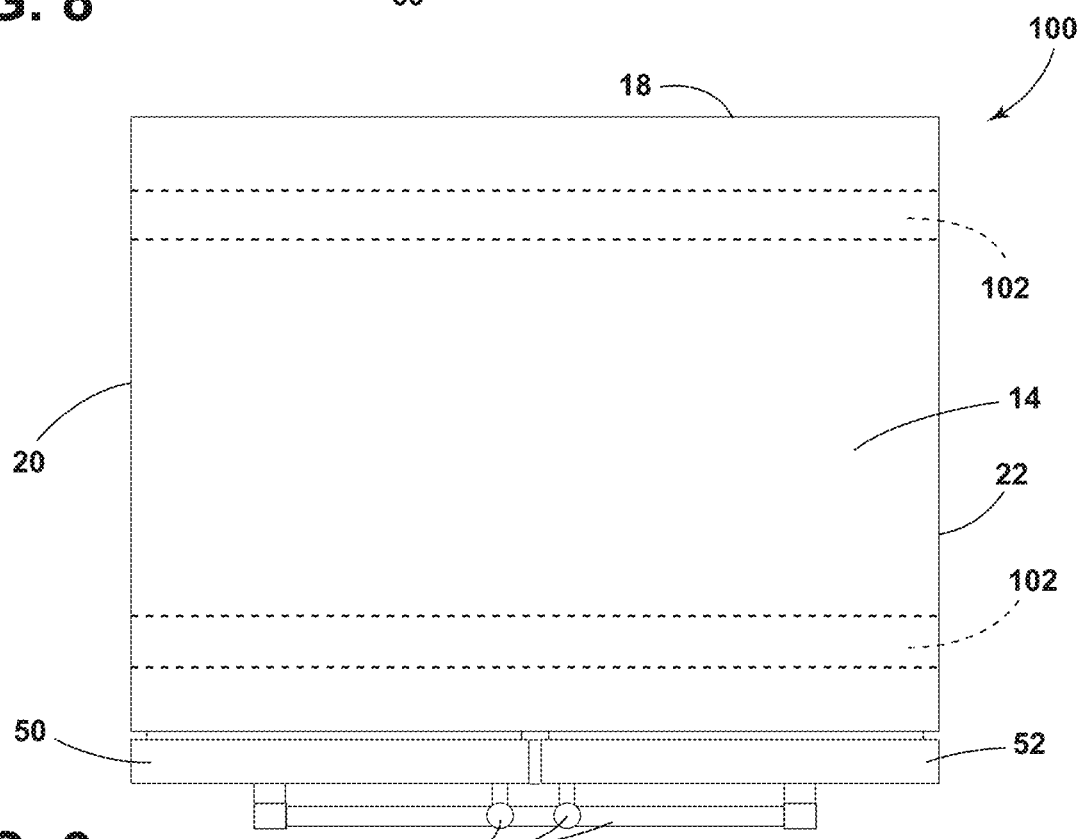
FIG. 9 is a top plan view of the appliance of FIG. 5.
Figure 10:
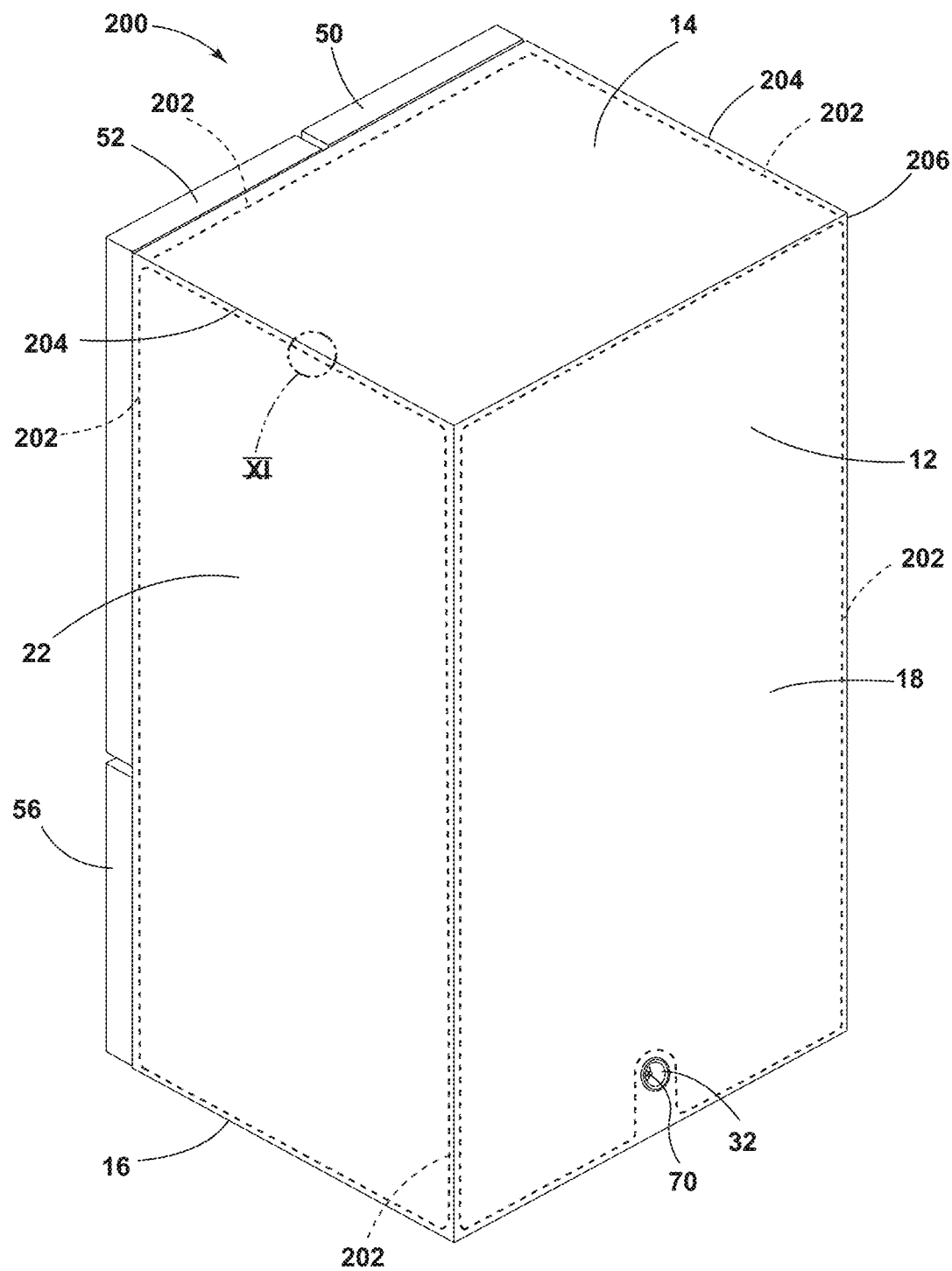
FIG. 10 is a rear top perspective view of another appliance of the present disclosure.

With reference now to FIGS. 4 and 4A, the appliance 100 is shown with the channels 102 formed within the insulation space 30. The filter media 40 for this assembly includes an elongate filter screen having a curved cross-section. In this instance, the planar extent of the rear wall 18 and/or the bottom wall 16 forms a first portion of the channel 102. The filter media 40 in the form of the elongate filter screen forms a second portion of the channel 102. Also, it will be understood that the channels 102, although shown in a linear configuration, may also have a curved shape or a circular shape that extends about the bottom wall 16 and the rear wall 18. The channels 102 could also include multiple branches that extend at any angle from the channels 102. Moreover, it will be understood that the channels may be disposed on any of the walls of the appliance 10 and are not limited to the rear wall 18 and the bottom wall 16. However, in the illustrated embodiments of FIGS. 3-4A, the channels 102 are disposed on the back wall and the bottom wall 16 as these are typically portions of the appliance 10 that are not exposed to the consumer. Accordingly, the first and second side walls 20, 22 can be exposed with no apparent additional structure that relates to the vacuuming process disposed thereon.

With reference now to FIGS. 5-9, the illustrated appliance 10 includes the channel 102 extending in a loop configuration. Specifically, the channel includes one vacuum port 32, which, in this instance is disposed on the bottom wall 16 of the appliance 10. The channel 102 extends about the bottom wall 16, the first side wall 20, the top wall 14, the second side wall 22, and back to the bottom wall 16, before returning to the second side wall 22, the top wall 14, and the first side wall 20 and back to the bottom wall 16. In this instance, negative pressure is obtained within the insulation space 30 when the vacuum port 32 is operably coupled with the external vacuum system. Air is then drawn through the channel 102, which extends through each of the four walls between the outer wrapper 12 and the inner liner 24 until a suitable negative pressure has been reached. It will be understood that the loop configuration for drawing air from the appliance 10 is not limited to the configuration shown. For example, another looped channel could extend about the back wall and could be operably coupled with the loop shown in FIGS. 5-9, or could be a separate loop with a separate vacuum port 32, which may depend on the needed speed and negative pressure that is desirable for the insulation space 30 of the appliance 10. It will be understood that the channels 102 of the appliance 10 may protrude from one or more of the walls, as shown in FIG. 3C, or may be formed within the insulative material 34 in the insulation space 30 of the appliance 10.

With reference now to FIGS. 10-15, an appliance 200 is illustrated having channels 202 that are again applied to the insulation space 30 between the inner liner 24 and the outer wrapper 12. However, in this instance, the channels 202 extend along edges 204 and vertices 206 of adjacent and joined walls of the outer wrapper 12. For example, one channel 202 is looped about a periphery of the second side wall 22, starting at the edge 204 defined by the second side wall 22 and the bottom wall 16, extending upward at the edge 204 defined by the front of the second side wall 22, the edge 204 defined between the second side wall 22 and the top wall 14, the edge 204 defined between the second side wall 22 and the rear wall 18, and back to the second side wall 22 and the bottom wall 16. This looped channel 102 is in fluid communication with a looped channel 102 extending about the periphery of the rear wall 18 and the vacuum port 32. The looped channel 102 extending about the periphery of the rear wall 18 starts at the edge 204 defined between the second side wall 22 and the rear wall 18, the edge 204 extending between the top wall 14 and the rear wall 18, the edge 204 extending between the first side wall 20 and the rear wall 18, and returning to the vacuum port 32 by way of the edge 204 extending between the bottom wall 16 and the rear wall 18.

As shown in FIGS. 11 and 11A, for the filter media 40, it is generally contemplated that a permeable filter tube 210 having a multitude of perforations 212 may be disposed along the edges 204 of joined walls, with the permeable filter tube 210 being in fluid communication with the vacuum port 32. The permeable filter tube 210 extends along multiple edges 204 and vertices 206 before terminating at the vacuum port 32. The permeable filter tube 210 may be coupled with an interior surface 214 of one or more of the walls 14, 16, 18, 20, 22 of the outer wrapper 12. The permeable filter tube 210 may be constructed from a sintered metal, porous plastic, or fiberglass material, for example, that allows air to be withdrawn from the insulation space 30 without removing the insulative material 34. Other air permeable structures may also be used to filter air from the insulation space 30 without removing the insulative material 34.

With reference now to FIG. 12, it is also generally contemplated that the channel 202 may be formed in an edge space 220 defined between the edge 204 of the appliance 10 and the filter media 40 that prevents the insulative material 34 from entering into the channel 202. In this instance, the channels 202 extend along the edge spaces 220 and eventually terminate at the vacuum port 32 located at a bottom of the rear wall 18. In the illustrated of FIG. 12, the filter media 40 is curvilinear outward (convex) and prevents the insulative material 34 from entering into the channel 202. However, it will be understood that the filter media 40 may be flat, or may be concave inward toward the insulative material 34. The structure of the channels 202 may depend upon the needed construction time determined for a particular appliance.

Figure 13:
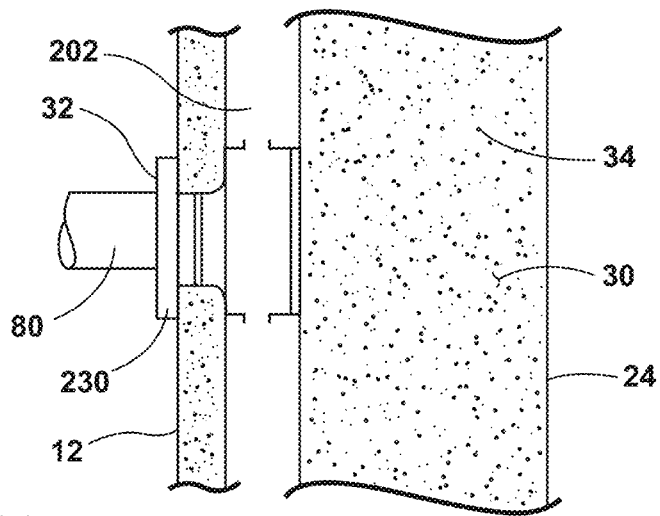
FIG. 13 is a partial side elevational view of a vacuum port of the present disclosure.
Figure 14:
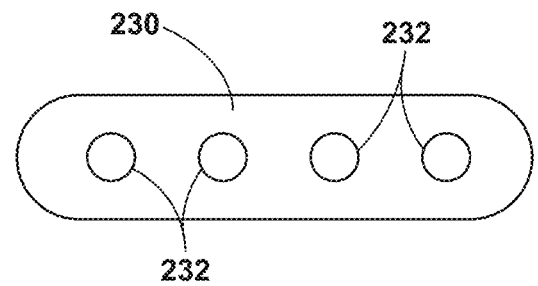
FIG. 14 is a front elevational view of a vacuum port panel of the present disclosure.
Figure 15:
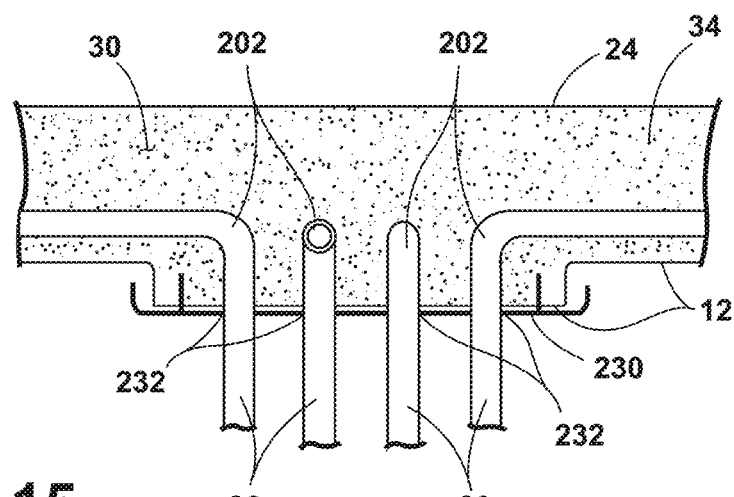
FIG. 15 is a top plan cross-sectional view of vacuum ports extending through a panel of an appliance of the present disclosure.

With reference now to FIGS. 13-15, in the illustrated embodiment, the vacuum ports 32 are in fluid communication with the channels 202 and may include a vacuum port panel 230 having apertures 232 for receiving and securing the vacuum ports 32. that places all of the vacuum ports 32 in close proximity. As shown in FIG. 13, the vacuum port 32 includes a valve that is configured to allow air to escape from the vacuum port 32, but not enter into the vacuum port 32 from the environment. As the channels 202 enter into the insulation space 30, the channels 202 extend in a variety of directions generally directed at distal vertices of the appliance 10. Consequently, a strong vacuum can be placed on the channels 202 and a negative pressure of the appliance 10, and specifically, the insulation space 30 of the appliance 10, can be maintained in a minimal amount of time. Accordingly, production, product quality, and energy efficiency in both making and using the appliance 10 can be increased.

For each of the embodiments set forth herein, the filter media 40 may include any of a variety of materials, including sintered material (metal, stainless steel, steel, alloys, aluminum, stone, ceramic, etc.), porous plastic, permeable fiberglass, etc. The filter media 40 will be understood to maintain structural integrity even under high vacuum environments with high negative pressure values. Consequently, the insulative material 34 is kept in the insulation space 30 and high thermal efficiency can be obtained.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An appliance comprising:
   an outer wrapper;
   an inner liner;
   an insulation space disposed between the outer wrapper and the inner liner;

vacuum ports disposed at the outer wrapper configured to permit air to be withdrawn from the insulation space; and filter media disposed proximate each of the vacuum ports, each filter medium configured to permit air to be withdrawn from the insulation space past the filter medium and through one of the vacuum ports.

2. The appliance of claim 1 further comprising:
insulative material disposed within the insulation space.

3. The appliance of claim 1, wherein
the outer wrapper defines a top wall, a bottom wall, a rear wall, a first side wall, and a second side wall; and
the vacuum ports are disposed at the rear wall.

4. The appliance of claim 1, wherein
each filter medium comprises a permeable filter tube comprising a multitude of perforations, the permeable filter tube disposed along edges of joined walls of the outer wrapper and terminating at one of the vacuum ports.

5. The appliance of claim 1 further comprising:
insulative material disposed within the insulation space;
wherein, each filter medium is disposed between one of the vacuum ports and the insulative material.

6. The appliance of claim 5, wherein
the filter media prevents the insulative material from being drawn through the vacuum ports when a negative pressure is applied to the insulation space.

7. The appliance of claim 1, wherein
each of the vacuum ports comprises a valve system configured to prevent air from entering the insulation space after air has been withdrawn from the insulation space.

8. The appliance of claim 1 further comprising:
a trim breaker sealing the outer liner to the inner wrapper in an airtight manner so that air can neither escape nor enter into the insulation space.

9. The appliance of claim 1 further comprising:
channels extending through the insulation space, each channel in fluid communication with a different vacuum port of the vacuum ports.

10. The appliance of claim 9 further comprising:
insulative material disposed within the insulation space;
wherein, each filter medium is disposed proximate a different vacuum port the vacuum ports and disposed along a different channel of the channels between the vacuum port and the insulative material, and
wherein, each filter medium is configured to permit air to be withdrawn from the insulation space past the filter medium and through the vacuum port to which the filter medium is proximate.

11. The appliance of claim 10, wherein
each filter medium comprises an elongate planar filter screen that extends along an entire length of the channel to which the filter medium is disposed along.

12. The appliance of claim 9, wherein
the channels protrude outward from a planar extent of the outer wrapper.

13. The appliance of claim 9, wherein
the channels protrude into the insulation space, and a planar extent of the outer wrapper forms a portion of each channel.

14. The appliance of claim 9, wherein
the outer wrapper defines a top wall, a bottom wall, a rear wall, a first side wall, and a second side wall; and
the channels are disposed at the rear wall and the bottom wall but not at the first side wall or at the second side wall.

15. An appliance comprising:
an outer wrapper, the outer wrapper defining a top wall, a bottom wall, a rear wall, a first side wall, and a second side wall;
an inner liner;
an insulation space disposed between the outer wrapper and the inner liner; and
vacuum ports disposed at the outer wrapper configured to permit air to be withdrawn from the insulation space;
wherein, at least one of the vacuum ports is disposed at each of the top wall, the bottom wall, and the rear wall; and
none of the vacuum ports are disposed at the first side wall or the second side wall.

16. The appliance of claim 15, wherein
some of the vacuum ports are disposed either (i) at first and second sides of the top wall proximate the first and second side walls or (ii) at first and second sides of the bottom wall proximate the first and second side walls.

17. The appliance of claim 15 further comprising:
channels extending through the insulation space, each channel in fluid communication with a different vacuum port of the vacuum ports.

18. The appliance of claim 17, wherein
the channels are disposed at the rear wall and the bottom wall but not at the first side wall or at the second side wall.

19. An appliance comprising:
an outer wrapper;
an inner liner;
an insulation space disposed between the outer wrapper and the inner liner;
vacuum ports disposed at the outer wrapper configured to permit air to be withdrawn from the insulation space; and
a vacuum port panel comprising apertures through which the vacuum ports extend;
wherein, all of the vacuum ports are in close proximity at the vacuum port panel.

20. The appliance of claim 19 further comprising:
channels extending through the insulation space, each channel in fluid communication with a different vacuum port of the vacuum ports.

21. An appliance comprising:
an outer wrapper;
an inner liner;
an insulation space disposed between the outer wrapper and the inner liner;
vacuum ports disposed at the outer wrapper configured to permit air to be withdrawn from the insulation space; and
channels extending through the insulation space, each channel in fluid communication with a different vacuum port of the vacuum ports.

* * * * *